United States Patent

Hrovat et al.

[11] Patent Number: 5,749,428
[45] Date of Patent: May 12, 1998

[54] TRACTION CONTROL THROUGH AN EFFECTIVE STATIC LINEARIZATION

[75] Inventors: Davorin D. Hrovat; Minh N. Tran, both of Dearborn, Mich.

[73] Assignee: Ford Global Technologies, Inc., Dearborn, Mich.

[21] Appl. No.: 610,939

[22] Filed: Mar. 5, 1996

[51] Int. Cl.$^6$ ................................................ B60K 15/00
[52] U.S. Cl. ................................................ 180/197; 701/85
[58] Field of Search ........................ 180/197; 364/426.01, 364/426.019; 701/85, 84, 82, 70

[56] References Cited

U.S. PATENT DOCUMENTS

| | | | |
|---|---|---|---|
| 4,771,849 | 9/1988 | Leiber et al. | 180/197 |
| 5,119,299 | 6/1992 | Tamura et al. | 180/197 |
| 5,137,105 | 8/1992 | Suzuki et al. | 180/197 |
| 5,369,586 | 11/1994 | Bridgens | 180/197 |

*Primary Examiner*—Brian L. Johnson
*Assistant Examiner*—Avraham Lerner
*Attorney, Agent, or Firm*—Peter Abolins

[57] ABSTRACT

Generating powertrain torque versus throttle angle position data is done in order to, in effect, linearize the relationship between the two. The results improve pressure control through a reduction in slip during a dry road to ice transition, and other maneuvers where large surface friction coefficent changes are common and may be encountered.

1 Claim, 4 Drawing Sheets

TRACTION CONTROL THROUGH AN EFFECTIVE STATIC LINEARIZATION

BACKGROUND OF THE INVENTION

1. Field of the Invention

This invention relates to electronic engine control of an internal combustion engine.

2. Prior Art

Traction control of various types is known. For example, it is known to reduce the power applied to the driving wheels through various combinations of controlling engine operating parameters such as spark advance, fuel injection, and throttle control. Braking may also be used to control driving wheel rotation.

Even though such control of the driving wheels is known, there still is a need to improve the performance of traction control in various operating environments. Conditions such as sudden transition from large coefficient of friction to low coefficient of friction surfaces are addressed by this invention.

SUMMARY OF THE INVENTION

An embodiment of this invention uses simple empirically or simulation generated engine and powertrain torque measured, for example, at the driving wheel versus throttle angle position data to in effect linearize the relationship. The results are improved traction control through substantial reduction, by factor 2 or 3, of a spin during, for example, dry road to ice transition when the traction control is initiated already on the dry road.

Application of the embodiment of this invention can lead to a substantially shorter and improved system response for situations where the spin has been initiated already on the dry road which subsequently changes to ice. Originally, without the proposed feature, the dry to ice spin duration was about 2 or 3 seconds. However, in accordance with this invention, the spin has been reduced to around 1 second.

DETAILED DESCRIPTION OF THE INVENTION

Figure 1:
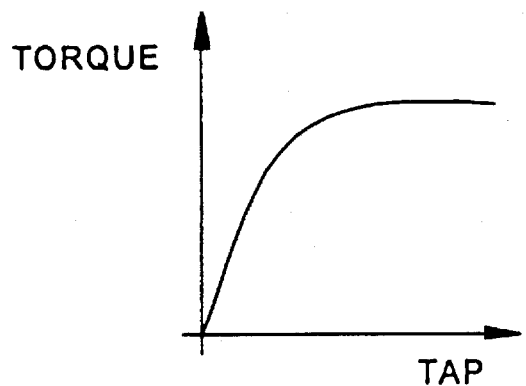
FIG. 1 is a graphic representation of throttle angle position versus powertrain torque.

A typical, steady-state relations between engine or powertrain torque and throttle angle position (TAP) for a given rpm is shown in FIG. 1. It can be seen that for larger TAP's, above some mid-region, large TAP changes are needed for a given delta torque change.

To statically linearize the above relationship one can proceed as follows:

(a) Introduce a variable gain factor f(FIG. 2) that will multiply the incremental control signal ($\Delta M_K$)

Figure 3:
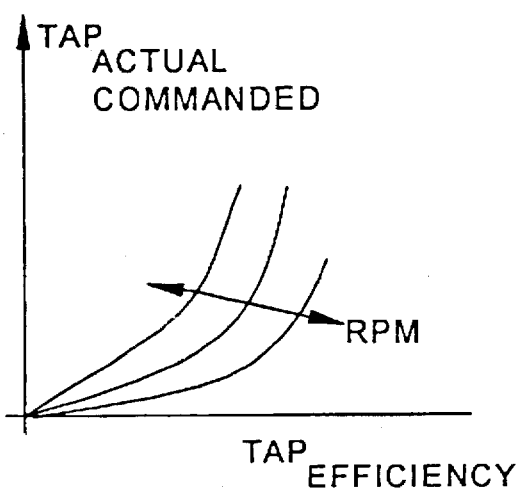
FIG. 3 is a graphic representation of effective throttle angle position versus throttle angle position which is actual and commanded, as a function of engine rpm.

(b) Use the concept of "effective TAP" as illustrated in FIG. 3. Essentially, one uses an inverse mapping for FIG. 1. If desired, this can be refined by rpm dependence.

(c) When either approach (a) or (b) are used, with the series throttle implementation, then ideally the resulting TP actual/commanded should be further translated into corresponding secondary throttle as per our previous invention disclosure.

Figure 4A:
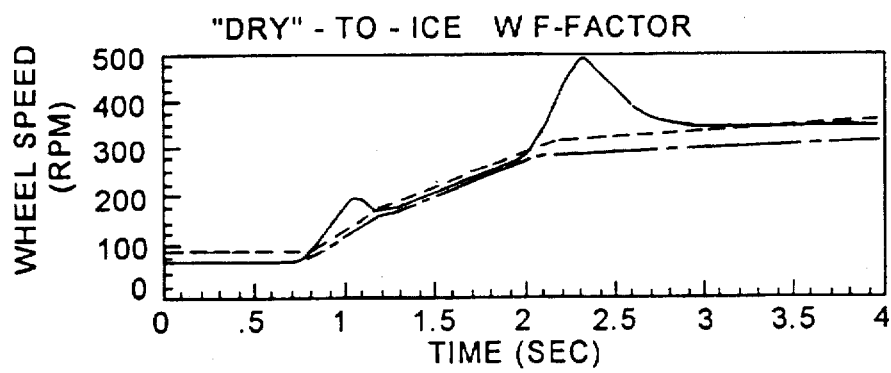
FIG. 4A and 4B are graphic representations of time versus wheel speed and time versus throttle angle position during a dry asphalt to ice transition test in accordance with an embodiment of this invention.
Figure 4B:
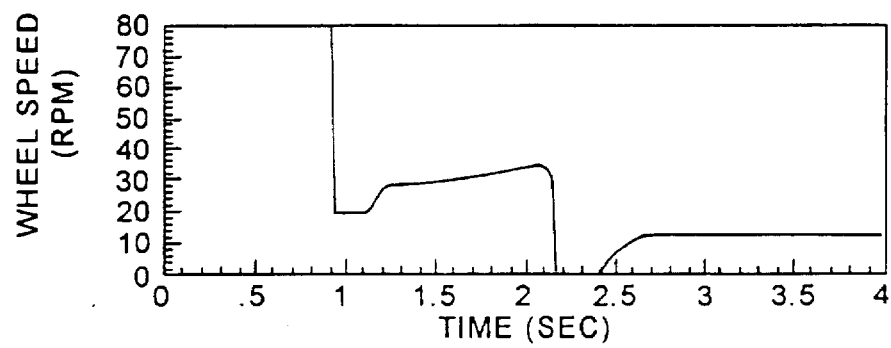

Referring to FIG. 4A, the time versus wheel speed of a vehicle including an embodiment of this invention is shown and in FIG. 4B a graphic presentation of time versus throttle angle position is shown.

Figure 5A:
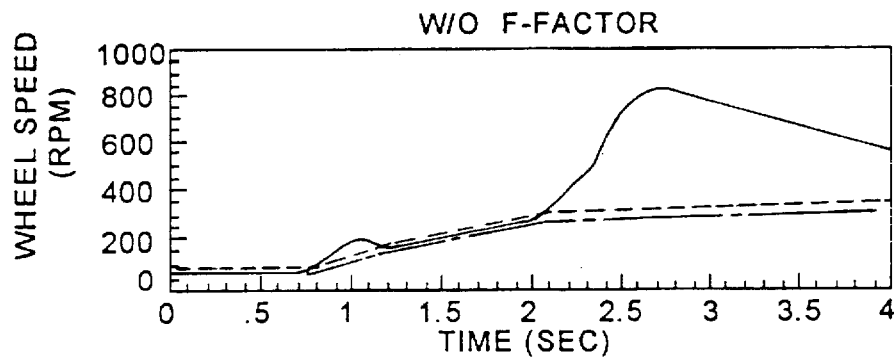
FIGS. 5A and 5B are graphic representations of time versus wheel speed and time versus throttle angle position during a dry asphalt to ice transition test in accordance with the prior art.
Figure 5B:
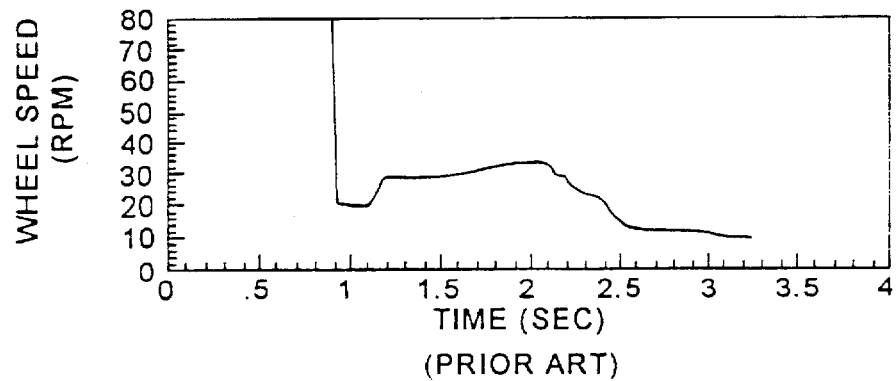

Referring to FIGS. 5A and 5B, in accordance with the prior art, the time versus wheel speed and the time versus throttle angle position is shown.

In summary, note from FIGS. 4A and 5A that while the initial spin, on dry road, was about the same for both implementations, the subsequent spin on ice, around time=2 sec., was much shorter with the present invention. This is the consequence of the fact that the throttle has been much more aggressively closed with the proposed method as it can be seen from FIG. 4B (compare with FIG. 5B).

Figure 6:
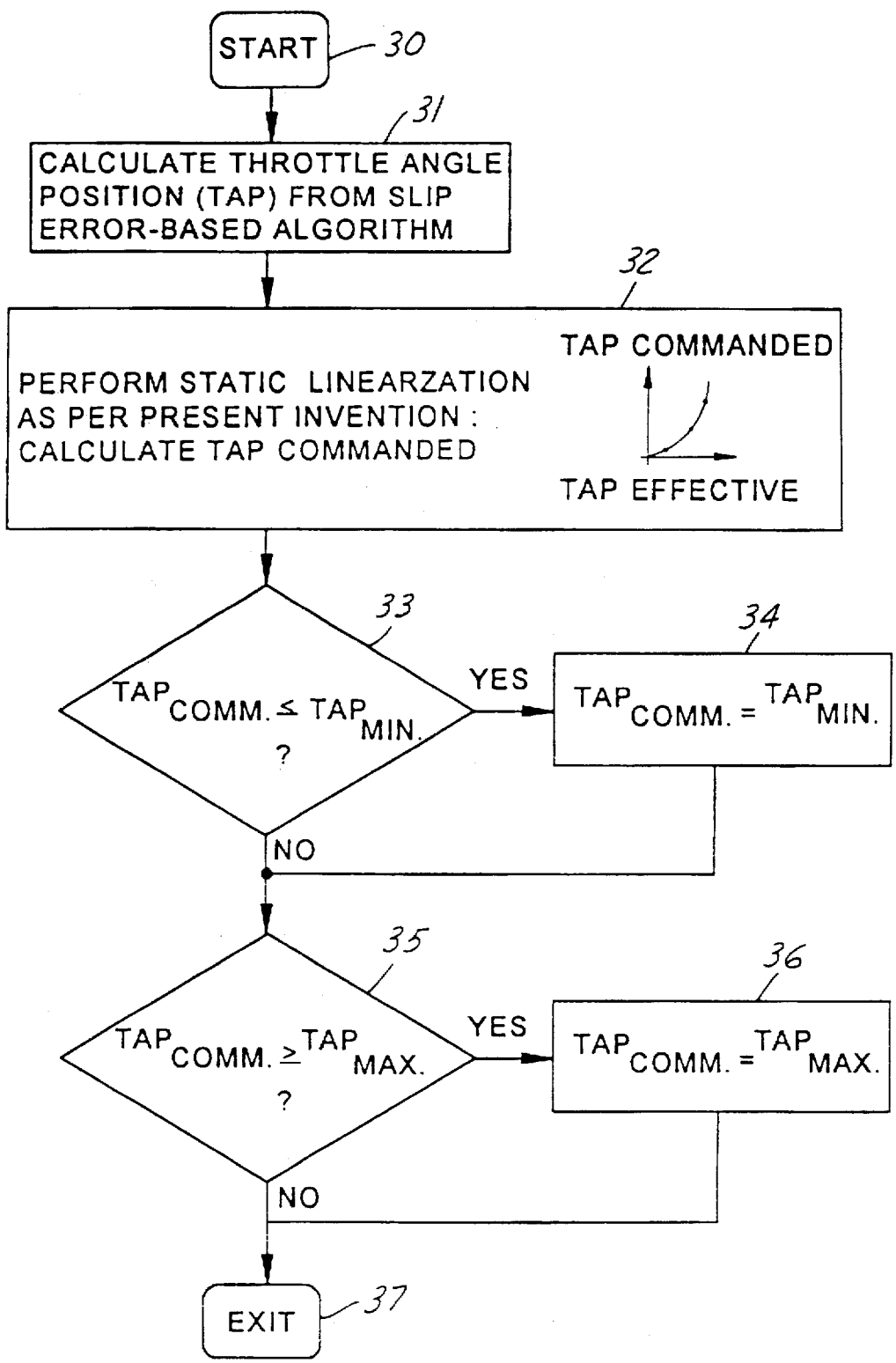
FIG. 6 is a logic flow diagram in accordance with an embodiment of this invention.

Referring to FIG. 6, a method for improved throttle control through an effective static linearization starts at a start block 30. Object flow from block 30 goes to block 31 where there is calculated a throttle angle position from slip error based algorithm. Logic flow from block 31 goes to a block 32 wherein there is performed a static linearization in accordance with the embodiment of this invention and a calculated commanded throttle angle position as calculated. Logic flow from block 32 goes to a decision block 33 wherein it is asked if the throttle angle position commanded is less than or equal to the throttle angle position minimum. If yes, then the throttle command is clipped at throttle minimum opening at block 34. Logic flow from block 34 goes to a decision from block 35. Also, if at decision block 33 the answer is no, logic flow goes to decision block 35. At decision block 35 it is asked if the commanded throttle angle position is greater than or equal than the maximum throttle angle position. If yes, logic flow goes to a block 36 wherein the commanded throttle angle position is set equal to the maximum angle position. Logic flow then goes to an exit block 37. If at decision block 35 the answer is no, logic flow goes to exit block 37.

Figure 7:
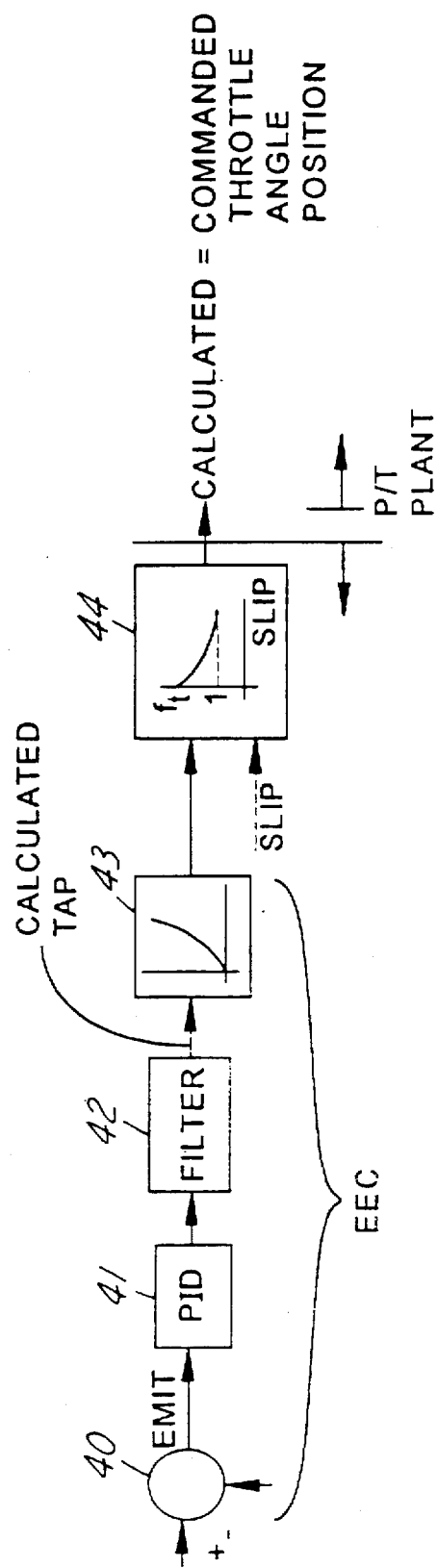
FIG. 7 is a block diagram in accordance with an embodiment of this invention.

Referring to FIG. 7, a summer 40 receives an input from desired slip coefficient in percent slip or, alternatively, in an equivalent rpm wheel speed, and receives a negative input of actual slip. An error output from summer 40 is applied to a proportional—integral—derivative (PID) controller 41 which then applies an output signal to a filter 42 to produce a calculated throttle angle position. Such calculated throttle angle position is applied to a transfer function 43 which then generates a commanded throttle angle position that can be applied to the engine. Transfer function 43 can be a table which is experimentally obtained as a steady-state relation between wheel torque and the throttle position where the wheel torque includes engine, torque conversion for automatic transmission and driveline transfer functions. Engine revolutions per minute (rpm) can also be used as a parameter so as to develop a transfer function curve for each rpm. The transfer function is selected to be an inverse complement of the transfer function of the engine and the powertrain being controlled. As a result, during operation of traction control, the control system linearization block 43 and engine combination has linear operation. Such linear operation is advantageous because it is easier to control.

If desired the transfer function connection shown in FIG. 7 can also include wheel slip. As shown, a block 44 has as inputs the output of block 43 and an indication of slip. The output of block 43 is used to control the throttle angle position and the operation of the powertrain plant. The transfer function of block 44 relates slip to throttle angle position. The combination of the transfer functions of block 43 and 44 can be considered to linearize the total powertrain transfer function of a vehicle including the engine, transmission, axle and wheels.

Figure 2:
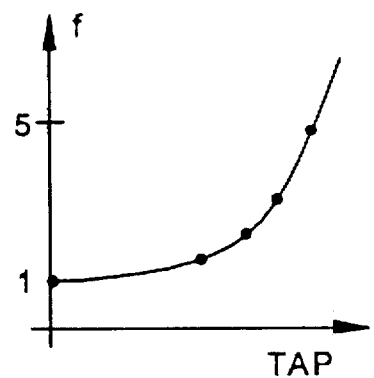
FIG. 2 is a graphic representation of throttle angle position versus a throttle gain factor.

Instead of the inverse relations, of block 43, one could use the non-linear gain functions, f, shown in FIG. 2, which is derived based on a slope or derivative to the throttle torque curve of FIG. 1. Similar gain function, $f_r$, could also be used to effectively linearize the tire slip versus force or torque relationship. This is shown as block 44 in FIG. 7.

Figure 8:
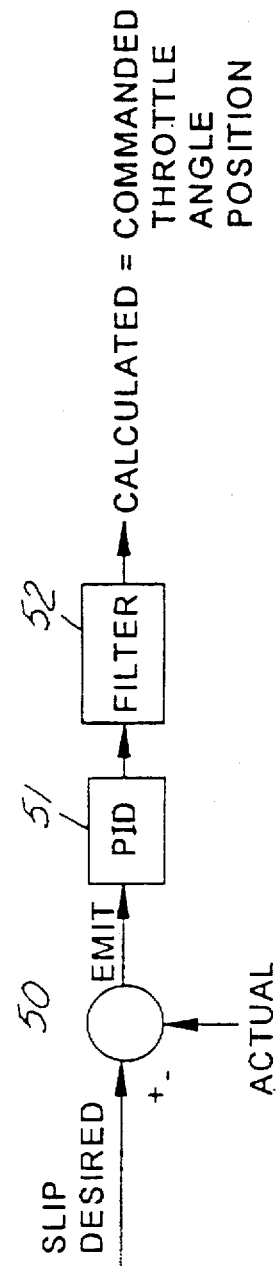
FIG. 8 is a block diagram in accordance with the prior art of a traction control system.

Referring to FIG. 8, in accordance with the prior art, the desired slip in the actual slip were applied to a summer 50 then applied to a PID controller 51 and then applied to a filter 52. The output of the filter 52 was the calculatable command at throttle angle position. Or specifically, the prior art did not include anything corresponding to block 43 and block 44 wherein the transfer function between the effective throttle angle position and the actual commanded throttle angle position is arrived at based on aforementioned empirical data.

Various modifications and variations, including possible alternatives for the above PID controller, will no doubt occur to those skilled in the arts to which this invention pertains. Such variations including non-linear inverse dynamic effects which rely upon the teachings through which disclosure has advanced the art are properly considered within the scope of these claims.

We claim:

1. A method of controlling traction for a vehicle having an internal combustion engine with electronically controlled operating parameters, including the steps of:

determining wheel slip error;

calculating throttle angle position based on wheel slip error;

performing static linearization of a throttle angle position to torque transfer function in view of the engine and powertrain non-linearities;

experimentally developing a table through a steady-state relation between wheel torque and the throttle position for each of a plurality of engine speeds, said table relating powertrain torque and throttle angle so that the total transfer function of the table and the internal combustion engine and powertrain is a linear transfer function, thus making traction control easier;

establishing a desired amount of wheel slip in percent slip or an equivalent rpm wheel speed;

detecting actual wheel slip;

determining an error wheel slip by comparing the actual and desired amount of wheel slip;

processing the error wheel slip using a proportional—integral—derivative controller and a filter to produce a calculated throttle angle position;

applying the throttle angle position to a transfer function generating a command throttle angle position;

establishing a predetermined minimum throttle angle position and a predetermined maximum throttle angle position from the statically linearized calculated throttle angle position;

determining if the commanded throttle angle position is less than the predetermined minimum throttle angle position;

if yes, setting commanded throttle angle position equal to the predetermined minimum throttle angle;

if no, determining if the commanded throttle angle position is greater than the predetermined maximum throttle angle position; and if the commanded throttle angle position is greater than the predetermined maximum throttle angle position, then setting the commanded throttle angle position equal to the predetermined maximum throttle angle position.

* * * * *